(12) United States Patent
Bassompiere et al.

(10) Patent No.: US 9,261,980 B2
(45) Date of Patent: Feb. 16, 2016

(54) MOTION CAPTURE POINTER WITH DATA FUSION

(75) Inventors: Cindy Bassompiere, Algueblanche (FR); Yanis Caritu, Saint Joseph la Riviere (FR); Bruno Flament, Saint Julien de Ratz (FR); Andrea Vassilev, Grenoble (FR)

(73) Assignees: MOVEA, Grenoble (FR); COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 811 days.

(21) Appl. No.: 13/001,307

(22) PCT Filed: Jun. 26, 2009

(86) PCT No.: PCT/EP2009/058024
§ 371 (c)(1),
(2), (4) Date: Mar. 25, 2011

(87) PCT Pub. No.: WO2009/156499
PCT Pub. Date: Dec. 30, 2009

(65) Prior Publication Data
US 2011/0199298 A1     Aug. 18, 2011

(30) Foreign Application Priority Data
Jun. 27, 2008 (FR) .................................. 08 03632

(51) Int. Cl.
*G06F 3/033* (2013.01)
*G06F 3/0346* (2013.01)
(Continued)

(52) U.S. Cl.
CPC .............. *G06F 3/0346* (2013.01); *G01C 21/16* (2013.01); *G06F 3/017* (2013.01); *G06F 3/033* (2013.01)

(58) Field of Classification Search
CPC .............. G06F 3/346; G06F 3/33; G06F 3/17; A63F 13/06; A63F 2300/105; G01C 21/16
USPC ................................................ 345/156–169
See application file for complete search history.

(56) References Cited

U.S. PATENT DOCUMENTS 5,181,181 A * 1/1993 Glynn ........................... 702/141
6,691,074 B1 * 2/2004 Moriya et al. ................. 702/190
(Continued)

FOREIGN PATENT DOCUMENTS

EP       1 441 279 A    7/2004
EP       1 870 670 A    12/2007
JP       2007/535776    12/2007

OTHER PUBLICATIONS

Welch, G. et al. "An Introduction to the Kalman Filter." Computer Graphics, SIGGRAPH, Conference Proceedings, Los Angeles, CA, pp. 1-49. (Aug. 12-17, 2001).
(Continued)

*Primary Examiner* — Jason Olson
*Assistant Examiner* — Sosina Abebe
(74) *Attorney, Agent, or Firm* — Stroock & Stroock & Lavan LLP

(57) ABSTRACT

The invention applies to a pointing device of a mobile element, for example a cursor, on a plane surface. The pointing device comprises a first sensor for measuring the angular rates of the device and a second sensor of the linear accelerations along three dimensions of said device. Preferably, the first sensor is a two-axis or three-axis gyrometer and the second sensor is a three-axis accelerometer. The invention makes it possible to render the movements of the mobile element in the surface of the orientation in which the pointing device is held by its user. This result is achieved by global resolution of the angles of torsion by combining the measurements of the first and second sensors either within an extended Kalman filter or by application of an optimization criterion. The invention also provides a method for estimating the parameters which characterize motion and/or orientation of an object in space from said combination of the measurements of the first and second sensors either within an extended Kalman filter or by application of an optimization criterion.

23 Claims, 3 Drawing Sheets

(51) Int. Cl.
*G01C 21/16* (2006.01)
*G06F 3/01* (2006.01)

(56) References Cited

U.S. PATENT DOCUMENTS

| | | | |
|---|---|---|---|
| 2005/0240347 A1* | 10/2005 | Yang | 701/220 |
| 2005/0243062 A1 | 11/2005 | Liberty | |
| 2007/0257885 A1 | 11/2007 | Liberty | |
| 2007/0273645 A1* | 11/2007 | Bang | G06F 3/0346 345/157 |
| 2008/0122787 A1* | 5/2008 | Huang et al. | 345/158 |
| 2008/0134784 A1* | 6/2008 | Jeng | G01P 15/18 73/514.01 |
| 2009/0326857 A1* | 12/2009 | Mathews | G06F 3/038 702/141 |

OTHER PUBLICATIONS

International Search Report from PCT/EP2009/058024, issued Aug. 14, 2009.
Written Opinion from PCT/EP2009/058024, uploaded Dec. 27, 2010.
Search Report from PCT/US05/15096, mailed on May 15, 2006.

* cited by examiner

MOTION CAPTURE POINTER WITH DATA FUSION

This application is a national phase application under §371 of PCT/EP2009/058024, filed Jun. 26, 2009, which claims priority to French Patent Application No. 0803632, filed Jun. 27, 2008, the entire content of which is expressly incorporated herein by reference.

BACKGROUND OF THE INVENTION

The invention relates to the use of an object instrumented by motion sensors and used to convert movements of a user carrying the object into movements of a point in a plane. These objects can thus be designated generically by the term "pointers". The user normally holds the pointer in his hand, although other modes of carriage may easily be envisaged depending on the applications, such as fixing to the head or one of the limbs of the carrier.

They may have diverse functions, notably: remote control of an audiovisual apparatus (television, reader/recorder of disks, hi-fi system), where the point is a program or a function to be chosen from a menu; remote control of a household apparatus where the pointer designates the apparatus and has it execute a function; computer remote control where the pointer is programmed as a function of the applications executed by the computer; electronic games interface where, depending on the game, the pointer may be an object manipulated by the user (golf club, tennis racket, bowling ball, handgun, hip gun or rifle, etc.); assistance for the man-machine interface or remote control intended for persons with reduced mobility (for example, fixing of a pointer to the head, the spectacles, an earpiece, or any other part tied to the movements of the head, so as to aid persons with motion deficiency or who are unable to use a conventional hand-held mouse to direct a pointer at the screen). In general, the pointer is equipped with buttons which allow selection of a command, which can be programmed to execute a function (or a service) or to associate a different pointer state during the pointing gesture (trajectory with button pressed vs trajectory with button released, thereby making it possible for example to take as information not the situation of a point on the screen but a cursor trajectory that may itself be associated with an action, etc.). The movements of the pointer in space comprise rotations and translations. They can be measured by sensors of various types: image sensors can measure rotations and translations at one and the same time by comparison of successive images and geometric transformations; a magnetometer, an accelerometer or a single-axis gyrometer can measure a rotation about said axis; a combination of magnetometers, accelerometers and/or of gyrometers can measure the translations and rotations about several axes; a combination of sensors of the previous types improve measurement accuracy, redundancy allowing determination of confidence intervals; the combination can comprise one or more cameras and several magnetometric, accelerometric and/or gyrometric sensors. Another rotation sensor, insensitive to accelerations, may be a brightness sensor. If it is a photoelectric cell, it is known that the amount of light received by said cell is proportional to its light receiving area and to the cosine of the angle of inclination of the rays with its normal. The light source may be the sun, or some other quasi-pointlike source, bulb type, situated far enough away for its emission rays to be considered parallel to one another over the whole of the volume of the gestural experience. To avoid problems of changeable ambient brightness, it is advantageously possible to use a "fly's eye" multi-facet type sensor, the angular direction of reception being the facet which measures the highest luminous flux.

SUMMARY OF THE INVENTION

The general problem that these applications of motion sensing pointers must solve is to take account of the manner in which the user holds the pointer, in particular of the orientation thereof in space. Indeed, if the pointer is held for example at 45° instead of being held horizontally, a horizontal or vertical motion of the pointer will be conveyed on the screen at which it points by a diagonal motion. This phenomenon is known by the name "tilt" or torsion. It should therefore be corrected in order for the pointer to be usable.

A first procedure for solving this problem is to provide mechanical means so that the sensors remain in a substantially fixed position in the frame of reference of the screen when the user imparts a torsion motion to the pointer. It is thus possible to provide for the sensor or sensors to be mobile within the pointer in the manner of a pendulum whose base has sufficient inertia to remain substantially fixed in spite of the torsion movements imparted to the pointer. Such a device is disclosed by U.S. Pat. No. 5,453,758. It is also possible to encapsulate said sensors in a stabilization device consisting of a pair of spheres tied to the pointer by rotation axles, as is the case in a compass aboard a boat or an aircraft. Such a device is disclosed by U.S. Pat. No. 5,440,326. A first drawback of these mechanical devices for compensating for the torsion of the pointer is that they are limited to restricted spans of angles of torsion and of rate of displacement. A second drawback is that these devices are bulky. A third drawback resides in the mechanical inertia of these devices and the delay in the horizontal alignment induced, thus barring them from real-time pointing applications.

A second procedure for compensating for this torsion of the pointer consists in computing the angles of torsion by using the measurements of some of the sensors embedded aboard the pointer, notably accelerometers, and to thereafter perform a transformation of the measurements of the other sensors from the frame of reference of the pointer into that of the screen by applying to said measurements one or more rotation matrices whose coefficients are dependent on the torsion angle or angles. Such procedures are disclosed notably by U.S. Pat. No. 5,902,968 where the main sensor is a gyrometer and the sensor for computing the angles of torsion is an accelerometer, patent application US 2004/0075650 where the main sensor is a camera coupled to accelerometers, the combination allowing tilt correction, patent application US 2002/0140745 where the main sensor is a GPS receiver and the tilt correction sensor a set of accelerometers and U.S. Pat. No. 7,158,118 where the main sensor consists of one or more gyrometers and the tilt correction sensor consists of one or more accelerometers. This procedure has the drawback of providing noisy results insofar as the torsion angles are computed with the measurements of some of the sensors only.

The present invention solves the problems not solved by the prior art by affording a compact device able to compensate for the orientation given to the pointer in a wide operating span. Accordingly, the invention can implement several different resolution procedures based on data fusion. A first group of such procedures uses observers; a second group uses optimization criteria.

For this purpose, the present invention discloses a device for pointing by a user at a mobile element in a plane surface, said device comprising at least one first sensor for measuring the angular velocities ($\omega_y$, $\omega_z$) of said device about at least two of its orthogonal axes (Y, Z), at least one second sensor for measuring the linear displacements of said device in relation to said two axes (Y, Z) and a third orthogonal axis (X), a module for computing the displacements (y, z) to be imparted to the mobile element in the plane surface as a function of the displacements (X, Y, Z) of the pointer in space, said computation module comprising a sub-module for compensating for the torsion imparted to the pointing device by implementing a data fusion algorithm applied to the outputs of the first and second sensors, wherein said data fusion algorithm comprises at least one non-linear operator which satisfies at least one of the following conditions: its state vector comprises at least one representation of the torsion chosen from the group consisting of Euler angles and quaternions; its state model comprises at least one first-order differential equation of said representation; its measurements vector comprises at least the measurements of the second sensor in relation to the axes X, Y, Z.

Advantageously, the first sensor is a two-axis gyrometer.

Advantageously, the first sensor is a three-axis gyrometer.

Advantageously, the second sensor is a three-axis accelerometer producing the outputs $a_x$, $a_y$, $a_z$.

Advantageously, the data merging algorithm is an extended Kalman filtering.

Advantageously, the Kalman filter satisfies at least one of the following conditions: its state vector (x) comprises at least one angle of torsion ($\theta$, $\psi$) of the pointing device; its state model comprises at least the expression for the angular rate ($\omega$) of said pointing device as a function of at least one of the angles of torsion ($\theta$, $\psi$); its measurements vector comprises at least the outputs of the second sensor ($a_X$, $a_Y$, $a_Z$).

Advantageously, the state vector of the Kalman filter is initialized to a state [$\theta_0$ $\psi_0$] chosen a priori and in that the a priori estimation of the state vector ($\hat{x}_k^-$) in the Kalman filter sampling step k is computed through the following formula:

$$\hat{x}_k^- = \begin{pmatrix} \hat{\theta}_k^- \\ \hat{\psi}_k^- \end{pmatrix} = \begin{pmatrix} \hat{\theta}_{k-1} \\ \hat{\psi}_{k-1} \end{pmatrix} + T_e \cdot \begin{pmatrix} \alpha \cdot \sqrt{\omega_Y^2 + \omega_Z^2} \\ \omega_x \end{pmatrix}$$

where $T_e$ is the filter sampling period.

Advantageously, the a priori estimation of the measurements ($\hat{y}_k^-$) in the Kalman filter sampling step k is computed through the following formula:

$$\hat{y}_k^- = \begin{vmatrix} -\sin\hat{\theta}_k^- \\ \cos\hat{\theta}_k^- \cdot \sin\hat{\psi}_k^- \\ \cos\hat{\theta}_k^- \cdot \cos\hat{\psi}_k^- \end{vmatrix}$$

Advantageously, the gain G of the Kalman filter is computed through the following formulae:

$$A_k = \left.\frac{\partial f}{\partial x}\right|_{\hat{x}_{k-1|k-1}}$$

$$C_k = \left.\frac{\partial h}{\partial x}\right|_{\hat{x}_{k-1|k-1}}$$

$$M = \begin{bmatrix} R_f & 0 \\ P_f \cdot C^T & P_f \cdot A^T \\ 0 & Q_f \end{bmatrix}$$

$$HM = qr(M) = \begin{bmatrix} L & K \\ 0 & P_f \\ 0 & 0 \end{bmatrix}$$

$$G = K^T \cdot L^{-T}$$

Advantageously, the correction of the state estimated a priori in the Kalman filter sampling step k is computed through the following formula:

$$\hat{x}_k = \hat{x}_k^- + K_k \cdot \left(\begin{bmatrix} a_{X,k} \\ a_{Y,k} \\ a_{Z,k} \end{bmatrix} - \hat{y}_k^-\right)$$

Advantageously, the components $\omega_v$ and $\omega_w$ of the angular rate in the reference frame of the user are computed through the following formulae:

$$\begin{cases} \omega_v = \cos\hat{\psi} \cdot \omega_Y - \sin\hat{\psi} \cdot \omega_Z \\ \omega_w = -\sin\hat{\theta} \cdot \omega_X + \cos\hat{\theta} \cdot \sin\hat{\psi} \cdot \omega_Y + \cos\hat{\theta} \cdot \cos\hat{\psi} \cdot \omega_Z \end{cases}$$

Advantageously, the Kalman filter satisfies at least one of the following conditions: the matrix $P_0$ of confidence accorded to the initial value of the state ($x_0$) comprises chosen values of the order of $10^{-2}$; the matrix Q of confidence accorded to its state model comprises chosen values, the highest of which are slightly greater than the standard deviation of the noise of the measurements of the first sensor; the matrix R of confidence accorded to the measurement model of the Kalman filter comprises chosen values, the highest of which are slightly greater than the standard deviation of the noise of the measurements of the second sensor.

Advantageously, the Kalman filter satisfies at least one of the following conditions: its state vector (x) is a quaternion of the form [cos $\alpha/2$, sin $\alpha/2$ $u_1$, sin $\alpha/2$ $u_2$, $\alpha/2$ $u_3$]; its state model is of the form:

$$\dot{q} = \frac{1}{2} \cdot \begin{vmatrix} q_0 \\ q_1 \\ q_2 \\ q_3 \end{vmatrix} \otimes \begin{vmatrix} 0 \\ \omega_X \\ \omega_Y \\ \omega_Z \end{vmatrix};$$

its measurements vector comprises at least the outputs of the second sensor ($a_X$, $a_Y$, $a_Z$).

Advantageously, the components $\omega_v$ and $\omega_w$ of the angular rate in the reference frame of the user are computed through the following formula:

$$\begin{pmatrix} 0 \\ \omega_u \\ \omega_v \\ \omega_w \end{pmatrix} = q \otimes \begin{pmatrix} 0 \\ \omega_X \\ \omega_Y \\ \omega_Z \end{pmatrix} \otimes \overline{q}$$

Advantageously, the Kalman filter satisfies at least one of the following conditions: its state vector (x) is of the form [a, b, c, d]=[sin θ, cos θ, sin ψ, cos ψ]; its state model is of the form:

$$\dot{x} = \begin{bmatrix} \dot{a} \\ \dot{b} \\ \dot{c} \\ \dot{d} \end{bmatrix} = \begin{bmatrix} 0 & -1 & 0 & 0 \\ 1 & 0 & 0 & 0 \\ 0 & 0 & 0 & -1 \\ 0 & 0 & 1 & 0 \end{bmatrix} \cdot \begin{bmatrix} a \\ b \\ c \\ d \end{bmatrix};$$

its measurement model is of the form:

$$y = \begin{bmatrix} a_X \\ a_Y \\ a_Z \end{bmatrix} = \begin{bmatrix} -a \\ b \cdot c \\ b \cdot d \end{bmatrix}$$

Advantageously, the components $\omega_v$ and $\omega_w$ of the angular rate in the reference frame of the user are computed through the following formulae:

$$\begin{cases} \omega_v = d \cdot \omega_Y - c \cdot \omega_Z \\ \omega_w = -a \cdot \omega_X + b \cdot c \cdot \omega_Y + b \cdot d \cdot \omega_Z \end{cases}$$

Advantageously, the state vector of the Kalman filter (x) is of the form [θ, ψω_u, ω_v, ω_w] and in that its measurements vector is of the form [a_X, a_Y, a_Z, ω_X, ω_Y, ω_Z].

Advantageously, the state model of the Kalman filter is of the form:

$$\begin{cases} \theta = \alpha \cdot \sqrt{\omega_v^2 + \omega_w^2} \\ \dot{\psi} = \omega_u \\ \dot{\omega}_u = -\frac{1}{\tau} \cdot \omega_u \\ \dot{\omega}_v = -\frac{1}{\tau} \cdot \omega_v \\ \dot{\omega}_w = -\frac{1}{\tau} \cdot \omega_w \end{cases}$$

where T is the time constant of the evolution model for the angular rate and in that the measurement model is of one of the following forms:

$$\begin{cases} a_X = -\sin\theta \cdot \cos\psi \\ a_Y = -\sin\psi \\ a_Z = \cos\theta \cdot \cos\psi \\ \omega_Y = \sin\theta \cdot \sin\psi \cdot \omega_u + \cos\psi \cdot \omega_v + \cos\theta \cdot \sin\psi \cdot \omega_w \\ \omega_Z = \sin\theta \cdot \cos\psi \cdot \omega_u - \sin\psi \cdot \omega_v + \cos\theta \cdot \cos\psi \cdot \omega_w \end{cases}$$

or $$\begin{cases} a_X = -\sin\theta \cdot \cos\psi \\ a_Y = -\sin\psi \\ a_Z = \cos\theta \cdot \cos\psi \\ \omega_X = \cos\theta \cdot \omega_u - \sin\theta \cdot \omega_w \\ \omega_Y = \sin\theta \cdot \sin\psi \cdot \omega_u + \cos\psi \cdot \omega_v + \cos\theta \cdot \sin\psi \cdot \omega_w \\ \omega_Z = \sin\theta \cdot \cos\psi \cdot \omega_u - \sin\psi \cdot \omega_v + \cos\theta \cdot \cos\psi \cdot \omega_w \end{cases}$$

Advantageously, the optimal resolution procedure is an optimization having as criterion the function:

$$f = \sum_{i=1}^{n} (\text{measurements}_{sensors} - \text{measurements}_{estimated})^T \cdot$$

$$(\text{measurements}_{sensors} - \text{measurements}_{estimated})$$

With a pair of vectors (measurements$_{sensors}$, measurements$_{estimated}$) chosen from the group $$\left( \text{measurements}_{sensors} = \begin{bmatrix} a_X \\ a_Y \\ a_Z \\ 0 \text{ or } \omega_X \\ \omega_Y \\ \omega_Z \end{bmatrix}, \right.$$

$$\left. \text{measurements}_{estimated} = \begin{bmatrix} -\sin\theta \\ \cos\theta \cdot \sin\psi \\ \cos\theta \cdot \cos\psi \\ \cos\theta \cdot \omega_u - \sin\theta \cdot \omega_w \\ \sin\theta \cdot \sin\psi \cdot \omega_u + \cos\psi \cdot \omega_v + \cos\theta \cdot \sin\psi \cdot \omega_w \\ \sin\theta \cdot \cos\psi \cdot \omega_u - \sin\psi \cdot \omega_v + \cos\theta \cdot \cos\psi \cdot \omega_w \end{bmatrix} \right),$$

$$\left( \text{measurements}_{sensors} = \begin{bmatrix} a_X \\ a_Y \\ a_Z \end{bmatrix}, \text{measurements}_{estimated} = \begin{bmatrix} -\sin\theta \\ \cos\theta \cdot \sin\psi \\ \cos\theta \cdot \cos\psi \end{bmatrix} \right)$$

The invention also provides a method for estimating parameters which characterize motion and/or orientation of an object in space, said object being equipped with at least one sensor providing information representative of the angular velocities of the displacement of said object in relation to at least two axes and of its torsion in relation to at least two angles, wherein a data fusion algorithm chosen from the group of observers and of optimal resolution procedures satisfies at least one of the following conditions: its state vector comprises at least one representation of the torsion chosen from the group of Euler angles and quaternions; its state model comprises at least one first-order differential equation of said representation; its measurements vector comprises at least an information representative of the torsion.

Advantageously, the data fusion algorithm implements an extended Kalman filtering.

Advantageously, the Kalman filter satisfies at least one of the following conditions: its state vector (x) comprises at least one angle of torsion (θ, ψ) of said object; its state model comprises at least the expression for the angular rate (ω) of said object as a function of at least one of the angles of torsion (θ, ψ); its measurements vector comprises at least the linear accelerations (a_X, a_Y, a_Z) of said object. Advantageously, the state vector of the Kalman filter (x) is of the form [θ, ψ, ω_u, ω_v, ω_w] and in that its measurements vector is of the form [a_X, a_Y, a_Z, ω_X, ω_Y, ω_Z].

Advantageously, the non-linear operator implements an optimal resolution procedure.

Another advantage of the invention is that it makes it possible to compensate for the angles of roll and of pitch, and not only the former as is the case in most of the prior art documents. Furthermore, the present invention is compatible with several types of sensors whose configuration can be chosen notably as a function of the objective cost of the application and of the specified performance. An additional advantage is that the parameters of the tilt compensation algorithm can also be tailored as a function of said objective cost and of said specified performance.

BRIEF DESCRIPTION OF THE DRAWINGS

The invention will be better understood, its various characteristics and advantages will emerge from the description which follows of several exemplary embodiments and its appended figures of which.

Figure 1:
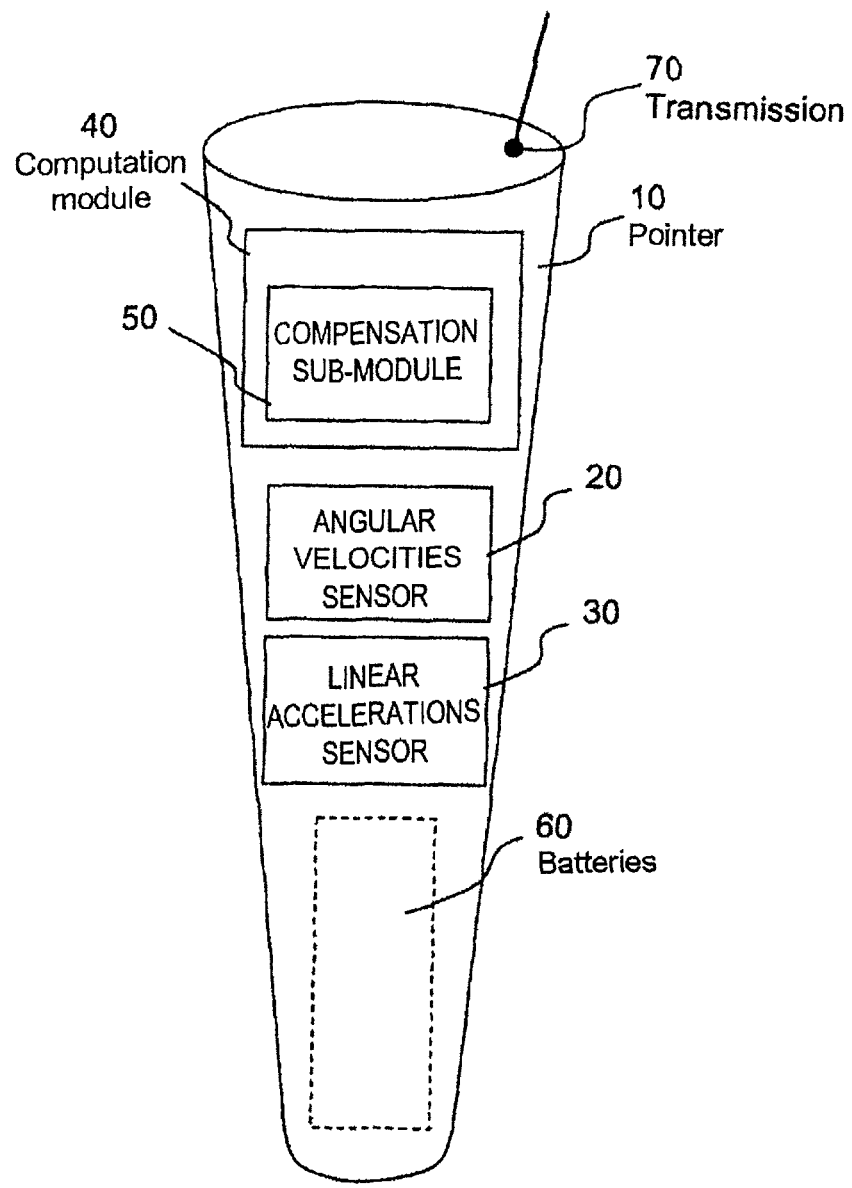
FIG. 1 represents in a simplified manner the hardware architecture of a pointer according to an embodiment of the invention.

The pointing device 10 or pointer advantageously has the form and the shape of a television remote control, that is to say it is of elongate form, able to be held in the user's hand. Alternatively, it may otherwise be fixed to one of the user's limbs, notably in games applications. The pointer is associated with a mobile element able to move in a plane surface, for example a screen or a writing surface. The movements of this mobile element are controlled by the movements of the pointer. The pointer is advantageously provided with buttons on several of its faces to control the functions to which access is made possible by the remote control. The pointer comprises a power supply 60 and a channel of transmission 70 for the object to be controlled. Radiofrequency transmission can be effected with a Bluetooth waveform and protocol or with a Wi-Fi waveform and protocol (Standard 802.11g). Transmission can be performed by infra-red or by radiofrequency. The transmitted signals are the commands corresponding on the one hand to the depression of one of the buttons present on the body of the pointer, which triggers the execution of a function and on the other hand to the sensing of the movement of the pointer so as to control the movements of a cursor on the control screen of the object to be controlled. These control signals are generated by the computation module 40 which comprises a sub-module 50 for compensating for the torsion imparted to the pointer by the user. This computation module comprises a microprocessor, for example a DSP Texas Instruments TMS320VC5509 for the most demanding applications in terms of computation time, or a 32-bit microcontroller with ARM core, for example one of those from the STR9 family, notably the STR9F12FAW32 from STM. The computation module also preferably comprises a flash memory necessary for storing the code to be executed and the permanent data which it requires and a dynamic work memory. The computation module receives as input the outputs from two types of sensors. On the one hand, angular velocity sensors 20 have the function of measuring the rotations of the pointer in relation to two or three axes. These sensors will preferably be gyrometers. It may be a two-axis gyrometer or a three-axis gyrometer. The respective merits of these two embodiments are discussed further on in the description in conjunction with the comments relating to FIG. 5. It is for example possible to use the gyrometers provided by Analog Devices with the reference ADXRS300. But any sensor capable of measuring angular rates or velocities is usable. It is in particular possible to envisage a camera whose image processing compares successive images so as to deduce therefrom the displacements which are combinations of translations and of rotations. It is then necessary, however, to have a substantially greater computational capability than that needed by a gyrometer. It is also possible to use magnetometers, measurement of whose displacement with respect to the terrestrial magnetic field makes it possible to measure the rotations with respect to the frame of reference of this field, it is for example possible to use the magnetometers with the reference HMC1001 or HMC1052 from the company Honeywell or KMZ41 from the company NXP. Whichever sensors are used, their measurements are read in the frame of reference of the pointer. If this frame of reference is not identical, to within a position translation, to the frame of reference of the user and to the frame of reference of the pointer, the measurements suffer a bias which will give rise to inconsistent displacements of the mobile element. This is why within the computation module 40 is provided a compensation sub-module 50 the function of which is to compute the displacements of the mobile element in the plane surface as a function of the displacements of the limb of the user holding the pointer, said function being corrected for the impact of the torsion imparted to the pointer by the user. The compensation sub-module recovers as input the outputs from a second sensor 30 which measures the linear accelerations of the pointer $a_x$, $a_y$, $a_z$. Preferably, the sensor 30 is a three-axis accelerometer. Advantageously, the sensors 20 and 30 are both produced by MEMS (Micro Electro Mechanical Systems) technology, optionally within one and the same circuit (for example reference accelerometer ADXL103 from Analog Devices, LIS302DL from Thomson, reference gyrometer MLX90609 from Melixis, ADXRS300 from Analog Devices). If appropriate, the MEMS module will be situated near the center of gravity of the pointing device, except if a particular embodiment, such as that illustrated by FIG. 5, justifies a different positioning. It will be noted, however, that a camera supplemented with an image processing device can also replace the two sensors 20 and 30, the angular rates/velocities and linear accelerations of displacement of the pointer being deducible from a correlation of successive images.

Figure 2:
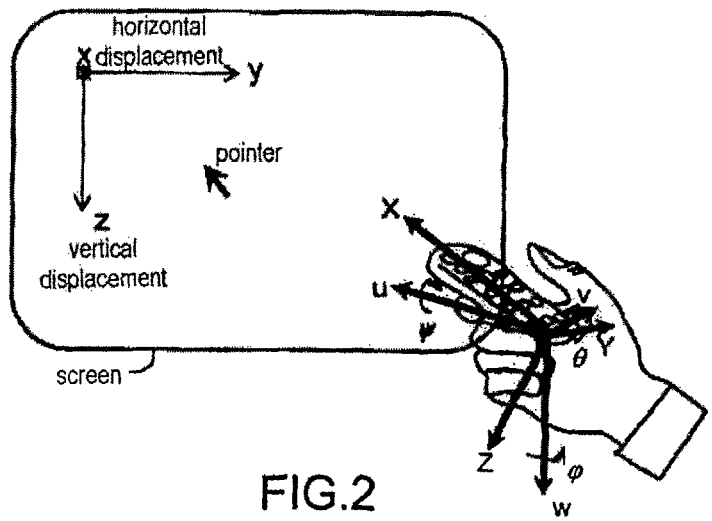
FIG. 2 illustrates the definition of the various reference frames in which are computed the movements of a pointer and of a cursor on a screen in an embodiment of the invention.

FIG. 2 illustrates the transformations of reference frames making it possible to circumvent said torsion.

We define by the term screen reference frame the orthonormal reference frame tied to the screen (xyz), the z axis being directed downwards. The displacement of the mobile element is defined in this reference frame along the axes y and z. A second reference frame corresponds to the reference frame of the device (XYZ), X being in the principal direction of pointing, Y toward the right and Z downwards from the device. The last reference frame (uvw), named the carrier reference frame, is associated with the part of the body which creates the pointing motion. This reference frame is defined by referring the reference frame (XYZ) back to the horizontal plane. The switch from the reference frame of the carrier to the reference frame of the device is therefore performed through two successive rotations (pitch θ, roll ψ). Moreover, the carrier not necessarily being placed facing the screen, the switch from this reference frame to the screen reference frame (xyz) is performed through a rotation (yaw φ).

Figure 3:
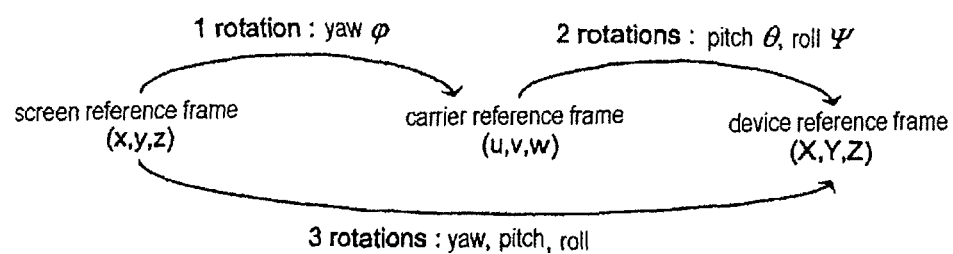
FIG. 3 illustrates the relations for switching between the various reference frames of FIG. 2.

FIG. 3 illustrates the relations for switching between the various reference frames of FIG. 2. We seek here to convey a horizontal motion of the carrier (with rotation) as a horizontal displacement of the mobile element and a vertical motion of the carrier (with rotation) as a vertical displacement of the mobile element. Intuitively, we see that even if the user is not facing the screen (non-zero angle of yaw), the result will not be modified since the movements will always be made in a horizontal and vertical manner. Consequently, the rotations must be measured in the reference frame of the carrier and not in the screen reference frame. The angle of yaw, conveying the rotation from the screen reference frame to the reference frame of the carrier, does not therefore pose us a problem.

A horizontal displacement of the mobile element is therefore defined by a rotation about the axis w, measured by $\omega_w$, and a vertical displacement by a rotation about the axis v, measured by $\omega_v$.

We define the standard position of the device as being the position in which the reference frames (uvw) and (XYZ) are aligned, i.e. the pitch and roll angles are zero. The device is then situated in a horizontal plane, rotated with respect to the screen reference frame by an angle of yaw.

When the device is in this position, the angular rates measured by the two-axis gyrometers ($\omega_Y$ and $\omega_Z$) are equal to $\omega_v$ and $\omega_w$, respectively. These two values give direct information on the horizontal displacements (rotation about the axis w represented by $\omega_w$) and vertical displacements (rotation about the axis v represented by $\omega_v$) and therefore the displacement of the mobile element on the screen ($d_Y$ and $d_Z$), doing so whatever the angle of yaw may be.

On the other hand, when the device is no longer in a standard position (roll and/or pitch angles being at non-zero positions, therefore reference frames (uvw) and (XYZ) are not aligned) and the carrier performs vertical and horizontal displacements (rotations about the axes v and w), the measurements $\omega_Y$ and $\omega_Z$ are different from $\omega_v$ and $\omega_w$. It is therefore not possible to associate them directly with the displacement of the mobile element on the screen. It is then necessary to know the orientation of the reference frame of the device with respect to the reference frame of the carrier (horizontal plane), therefore the angles of pitch and roll, so as to refer the gyrometric measurements, $\omega_Y$ and $\omega_Z$, to the reference frame of the carrier (uvw) and deduce therefrom the displacements $d_y$ and $d_z$.

The device of the invention makes it possible to determine the angular rates $\omega_v$ and $\omega_w$, while taking into account pitch and roll angles, if relevant.

Figure 4:
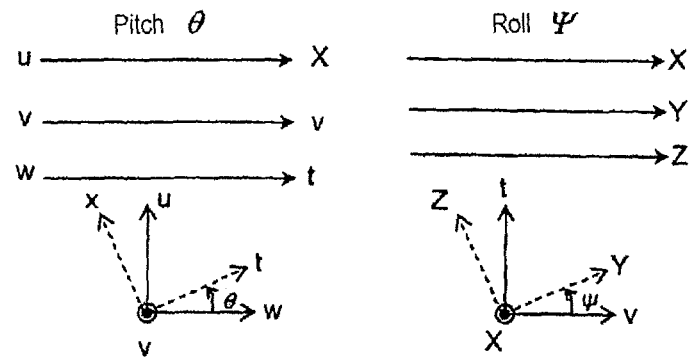
FIG. 4 explains the coordinates and the angles of roll and of pitch used in the description of the present invention.

FIG. 4 explains the coordinates and the roll and pitch angles used in the description of the present invention. The rotation matrix R expressing the rotation for switching from the reference frame (uvw) to the reference frame (XYZ) is:

$$R = \begin{pmatrix} \cos\theta & 0 & -\sin\theta \\ \sin\theta \cdot \sin\psi & \cos\psi & \cos\theta \cdot \sin\psi \\ \sin\theta \cdot \cos\psi & -\sin\psi & \cos\theta \cdot \cos\psi \end{pmatrix} \quad \text{Eq. 1}$$

The accelerometric and gyrometric sensors return respectively the measurements denoted ($a_X$, $a_Y$, $a_Z$) and ($\omega_Y$, $\omega_Z$) in the reference frame (XYZ) of the pointing device. The problem to be solved is therefore to express these measurements in the reference frame (uvw):

$$\begin{cases} \omega_X = \cos\theta \cdot \omega_u - \sin\theta \cdot \omega_w \\ \omega_Y = \sin\theta \cdot \sin\psi \cdot \omega_u + \cos\psi \cdot \omega_v + \cos\theta \cdot \sin\psi \cdot \omega_w \\ \omega_Z = \sin\theta \cdot \cos\psi \cdot \omega_u - \sin\psi \cdot \omega_v + \cos\theta \cdot \cos\psi \cdot \omega_w \\ a_X = -\sin\theta \\ a_Y = \cos\theta \cdot \sin\psi \\ a_Z = \cos\theta \cdot \cos\psi \end{cases} \quad \text{Eq. 2}$$

The solutions proposed in the prior art for effecting this change of reference frame, notably those disclosed by U.S. Pat. No. 7,158,118 which employs MEMS micro-accelerometers and micro-gyrometers, are characterized by two main points:

compensation for the angle of roll of the device with respect to the carrier so as to eliminate its influence on the displacement of the mobile element on the screen; this is generally performed by virtue of the accelerometric measurements; on the other hand, although the angle of pitch gives rise to disturbances similar to the angle of roll, it is not compensated for;

analytical resolution of the equations for changing reference frame; nevertheless, in this case, the sensor measurements are used without any prior processing and the angle of roll is determined only on the basis of the accelerometric measurements; the displacement of the cursor on the screen may therefore be impaired when vibratory disturbances are present (environment, low-amplitude hand tremble equivalent to increased measurement noise, failed sensor) or when abrupt movements are made. Indeed, these phenomena are measured directly by the accelerometers but are nevertheless not corrected by the analytical equations, hence the result is degraded. This implementation is therefore not very robust.

DETAILED DESCRIPTION OF THE PREFERRED EMBODIMENT

In a favored embodiment of the invention, the estimation of the angles of roll and of pitch is simultaneous and is done by a data fusion procedure, thus making it possible to improve the robustness of the displacement of the mobile element on the screen in relation to the orientation of the device with respect to the carrier. Two classes of resolution procedures are usable: procedures calling upon observers; those using an optimization criterion. In the first group, a favored embodiment calls upon an Extended Kalman Filter (EKF). In a Kalman filter, an innovation computed on the basis of a measurement vector which corrects with the gain of the filter, the state vector estimated a priori by a state model is inserted at the sampling frequency. The extended version of the Kalman filter makes it possible to use non-linear state and measurement models. The procedure is described in greater detail further on in the description. By employing this filtering technique, it has become possible to merge the accelerometric and gyrometric measurements so as to estimate the roll and pitch angles. In this way, the errors present in the measurements (measurement noise, disturbances, etc.) mutually compensate one another. An operation of smoothing the sensor measurements is thus performed, thereby culminating in a solution which is optimal and therefore robust to vibratory disturbances. This represents a definite advantage for the employment of the device by creating a displacement of the mobile element on the screen devoid of any tremble. An exemplary optimization procedure is given further on in the description.

Figure 5:
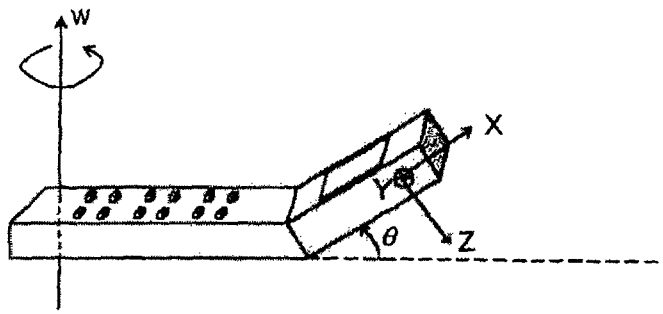
FIG. 5 represents a pointing device in an embodiment comprising a three-axis gyrometer.

FIG. 5 represents a pointing device in an embodiment comprising a three-axis gyrometer. As indicated above, the sensor of angular rates/velocities can have two or three axes. In the first case, this can entail two single-axis sensors or a two-axis sensor. The invention makes it possible to compute the displacement of the mobile element in a plane surface on the basis of the movements of the pointer for small values of the angle of pitch (less than 30°). This condition is fulfilled in most pointing applications, except perhaps in games where the amplitude of the movement is particularly significant. The choice of a gyrometer with two measurements axes is a solution which is simpler and less expensive to implement than a solution based on a three-axis gyrometer. In this second solution, the pointing device comprises for example a three-axis accelerometer MEMS sensor 20 and a three-axis gyrometer MEMS sensor 30 composed of three single-axis or of one single-axis and of one two-axes. The third gyrometer axis makes it possible to circumvent the constraint on the value of the pitch angle. The compensation of the pitch and roll angles is total, the displacement of the cursor on the screen then becomes independent of the orientation of the device on the carrier. An exemplary application is presented in FIG. 5. The sensors are positioned in the top part of the device whose orientation is different from the bottom part, held by the carrier. The sensor axes are defined by the reference frame (X, Y, Z). When the carrier of the device performs a rotation about the axis w, the gyrometer, placed in the inclined part of the device, detects a rotation around the axes X and Z, dependent on the angle of pitch θ. The determination of the angle θ coupled with the knowledge of the measurements of angular rate around the axes X and Z then makes it possible to deduce therefrom the angular rate/velocity about the axis w. The advantage of a three-axis gyrometer measurement can also be highlighted on a device whose shape does not make it possible to define a reference orientation, this being for example the case for a spherical device, no reference frame of which makes it possible to determine the orientation.

Figure 6:
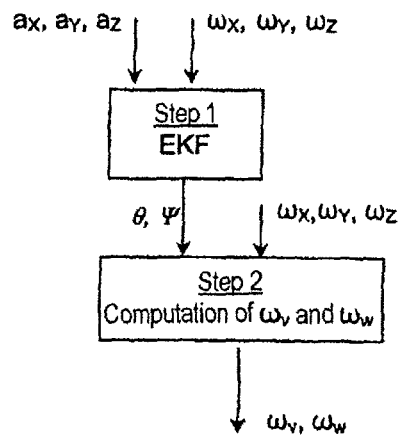
FIG. 6 is a flowchart of the processing tasks in several embodiments of the invention.

FIG. 6 is a flowchart of the processing tasks in an embodiment of the invention. The processing tasks effected are distinguished in the two embodiments indicated above (two-axis or three-axis gyrometer) solely by the fact that in the first case the angular rate/velocity about the axis X of the pointing device is taken equal to zero and therefore eliminated from the models and computations. In the embodiment represented, the torsion compensation operation is performed in two steps, a step 1 of estimating the angles θ and ψ of pitch and of roll by an EKF and a step 2 of computing the angular rate components $\omega_v$, $\omega_w$ related to the displacement of the mobile element with respect to the frame of reference of the user.

The EKF is the non-linear version of the Kalman filter. See for example: KALMAN R. E. A new approach to linear filtering and prediction problems. *Transactions of the ASME—Journal of Basic Engineering*, 82, p. 35-45, 1960; WELCH G., BISHOP G. An introduction to the Kalman Filter. *SIGGRAPH* 2001. The problem is solved by this family of filters in a statistical manner by minimizing the estimation error covariance. Consequently, the Kalman filter, used in its initial form, is an optimal resolution procedure. When the problem is defined in a non-linear manner (EKF), the propagation of the covariance of the error of the state variables is computed by virtue of the jacobian matrices defined at the current value of the state variables. A linearization is therefore necessary at each computation step, and this may be a source of numerical instabilities and consequently of divergence of the solution. Nevertheless, the EKF is the filter most widely employed on the physical methods given its robustness and the quality of the results obtained. The implementation of this filter is done in a favored manner by using the factorization of type known by the acronym "QR" of the EKF proposed by Barraud (BARRAUD A. Outils d'analyse numérique pour l'automatique [Numerical analysis tools for automation]. Published by Hermes—Lavoisier, Paris, 2002). This implementation exhibits the advantage of offering better stability of the covariance matrices than the standard implementations of the EKF. This algorithm is recalled succinctly below.

We begin by initializing a state vector which comprises the variables representative of the state of the system:

$$\hat{x}_0 = E[x_0] \qquad \text{Eq. 3}$$

$$P_0 = E[(x_0 - \hat{x}_0)(x_0 - \hat{x}_0)^T] = P_{0\_f}{}^T P_{0\_f} \qquad \text{Eq. 4}$$

where
$\hat{x}_0$: initial state vector (k=0)
$P_0$: covariance matrix tied to the initial state error
$P_{0\_f}$: factorized form of the matrix $P_0$ of covariance of the state error ($P_0 = P_{0\_f}{}^T \cdot P_{0\_f}$).
$E[x]$ is the mathematical expectation
T is the matrix transposition operator.

On the basis of the following other notation:
$\hat{x}_{k|k-1}$: state vector estimated at the instant k on the basis of the instant k−1
$\hat{x}_{k|k}$: state vector estimated at the instant k on the basis of the instant k
$y_k$: measurements vector
$\hat{y}_k$: estimated values of the measurements vector
f, h: functions of the states model, of the measurement model
two models for predicting the evolution of the state vector and the measurements vector are then defined:

$$\hat{x}_{k|k-1} = f(\hat{x}_{k-1|k-1})$$

$$\hat{y}_k = h(\hat{x}_{k|k-1})$$

we then define the corrections to be applied to the state vector, taking account of the covariances of the modeling noise (Q) and of the measurements noise (R):

$$A_k = \frac{\partial f}{\partial x}\bigg|_{\hat{x}_{k-1|k-1}} \qquad \text{Eq. 5}$$

$$C_k = \frac{\partial h}{\partial x}\bigg|_{\hat{x}_{k-1|k-1}} \qquad \text{Eq. 6}$$

$$M = \begin{bmatrix} R_f & 0 \\ P_f \cdot C^T & P_f \cdot A^T \\ 0 & Q_f \end{bmatrix} \qquad \text{Eq. 7}$$

$$HM = qr(M) = \begin{bmatrix} L & K \\ 0 & P_f \\ 0 & 0 \end{bmatrix} \qquad \text{Eq. 8}$$

$$G = K^T \cdot L^{-T} \qquad \text{Eq. 9}$$

$$\hat{x}_{k|k} = \hat{x}_{k|k-1} + G \cdot (y_k - \hat{y}_k) \qquad \text{Eq. 10}$$

where:
$A_k$: jacobian matrix of the function f of the state model, computed at $\hat{x}_{k-1|k-1}$
$C_k$: jacobian matrix of the function h of the measurement model, computed at $\hat{x}_{k-1|k-1}$
HM: triangularization of M by orthogonal factorization
$R_f$: factorized form of the matrix R of covariance of the measurement noise ($R = R_f{}^T \cdot R_f$).

$Q_f$: factorized form of the matrix Q of covariance of the modeling noise ($Q=Q_f^T \cdot Q_f$).

G is the quantity that is generally called the gain in a Kalman filter. It will be noted that the matrices are in fact computed at each sampling step, the index k having however been omitted above so as make it easier to read the formulae.

In a first embodiment, the state vector chosen to solve the problem is: $x=[\theta \psi]$. Where $\theta$ and $\psi$ are respectively the pitch and roll angles. The measurements vector is: $y=[a_X\ a_Y\ a_Z]$ (measurements of the accelerometer or accelerometers). The equations of the state model are obtained on the basis of the expression for the annular rate:

$$\omega = \begin{pmatrix} \dot{\psi} - \dot{\varphi} \cdot \sin\theta \\ \dot{\varphi} \cdot \cos\theta \cdot \sin\psi + \dot{\theta} \cdot \cos\psi \\ \dot{\varphi} \cdot \cos\theta \cdot \cos\psi - \dot{\theta} \cdot \sin\psi \end{pmatrix} \qquad \text{Eq. 11}$$

here the angle $\varphi$ represents the angle of yaw making it possible to switch from the reference frame (uvw) to the reference frame (XYZ). However, given the definition of these reference frames, this angle is zero and therefore its derivative also.

The expression for $\omega$ becomes:

$$\omega = \begin{pmatrix} \dot{\psi} \\ \dot{\theta} \cdot \cos\psi \\ -\dot{\theta} \cdot \sin\psi \end{pmatrix} \qquad \text{Eq. 12}$$

there therefore exist three relations conveying the evolution of $\theta$:

$$\dot{\theta} = -\frac{\omega_Z}{\sin\psi} \qquad \text{Eq. 13}$$

$$\dot{\theta} = \frac{\omega_Y}{\cos\psi} \qquad \text{Eq. 14}$$

$$\dot{\theta} = \alpha \cdot \sqrt{\omega_Y^2 + \omega_Z^2} \qquad \text{Eq. 15}$$

with $\alpha = \pm 1$.

We choose to use equation 15 which makes it possible to involve the two or three gyrometric measurements, thereby enhancing the robustness of the filter (joint use of the gyrometer and accelerometer measurements). The parameter $\alpha$ is then determined with one of the other two expressions. The gyrometric measurements are therefore used as input variables for the model.

We note moreover that $\omega_X$ is equal to the derivative of the roll angle.

The equations of the state model are therefore:

$$\begin{cases} \dot{\theta} = \alpha \cdot \sqrt{\omega_Y^2 + \omega_Z^2} \\ \dot{\psi} = \omega_X \end{cases} \qquad \text{Eq. 16}$$

in the embodiment with sensor of angular rates in relation to two axes, it will be assumed that $\omega_X = 0$.

The equations of the measurement model are:

$$y = \text{measurements}_{accelero} = R(\theta, \psi) \cdot G_0 \qquad \text{Eq. 17}$$

with $R(\theta, \psi) = \begin{pmatrix} \cos\theta & 0 & -\sin\theta \\ \sin\theta \cdot \sin\psi & \cos\psi & \cos\theta \cdot \sin\psi \\ \sin\theta \cdot \cos\psi & -\sin\psi & \cos\theta \cdot \cos\psi \end{pmatrix}$ and $G_0 = [0\ 0\ 1]$ i.e. $y = \begin{vmatrix} -\sin\theta \\ \cos\theta \cdot \sin\psi \\ \cos\theta \cdot \cos\psi \end{vmatrix} \qquad \text{Eq. 18}$ Finally, the angular rates in the reference frame of the user are determined by the relations:

$$\begin{cases} \omega_v = \cos\psi \cdot \omega_Y - \sin\psi \cdot \omega_Z \\ \omega_w = -\sin\theta \cdot \omega_X + \cos\theta \cdot \sin\psi \cdot \omega_Y + \cos\theta \cdot \cos\psi \cdot \omega_Z \end{cases} \qquad \text{Eq. 19}$$

The various steps of the algorithm implemented in the Kalman filter are now detailed below.

In the initialization step, the initial state vector $x_0$ is taken equal to zero or to a state $[\theta_0, \psi_0]$ chosen a priori:

$$X_D=[00]\ \text{or}\ X_0=[\theta_0 \psi_0] \qquad \text{Eq. 20}$$

The estimation of the torsion is then carried out within the extended Kalman filter through the succession of the following computations:

a priori estimation of the state vector by numerical integration of the chosen dynamic model (in the following equation, $T_e$ is the sampling period):

$$\hat{x}_k^- = \begin{pmatrix} \hat{\theta}_k^- \\ \hat{\psi}_k^- \end{pmatrix} = \begin{pmatrix} \hat{\theta}_{k-1} \\ \hat{\psi}_{k-1} \end{pmatrix} + T_e \cdot \begin{pmatrix} \alpha \cdot \sqrt{\omega_Y^2 + \omega_Z^2} \\ \omega_x \end{pmatrix} \qquad \text{Eq. 21}$$

a priori estimation of the measurements:

$$\hat{y}_k^- = \begin{vmatrix} -\sin\hat{\theta}_k^- \\ \cos\hat{\theta}_k^- \cdot \sin\hat{\psi}_k^- \\ \cos\hat{\theta}_k^- \cdot \cos\hat{\psi}_k^- \end{vmatrix} \qquad \text{Eq. 22}$$

computation of the gain G of the Kalman filter (use of the factorized form of QR type of the EKF), defined by equations 7, 8 and 9.

correction of the a priori estimated state:

$$\hat{x}_k = \hat{x}_k^- + K_k \cdot \left( \begin{bmatrix} a_{X,k} \\ a_{Y,k} \\ a_{Z,k} \end{bmatrix} - \hat{y}_k^- \right) \qquad \text{Eq. 23}$$

The components $\omega_v$ and $\omega_w$ can then be computed through the following formulae:

$$\begin{cases} \omega_v = \cos\hat{\psi} \cdot \omega_Y - \sin\hat{\psi} \cdot \omega_Z \\ \omega_w = -\sin\hat{\theta} \cdot \omega_X + \cos\hat{\theta} \cdot \sin\hat{\psi} \cdot \omega_Y + \cos\hat{\theta} \cdot \cos\hat{\psi} \cdot \omega_Z \end{cases} \quad \text{Eq. 24}$$

To implement the algorithm of the EKF, it is necessary to determine a series of parameters relating to the confidence accorded to the initial state, these being grouped together in the matrix $P_0$, to the state model, these being grouped together in the matrix Q, and to the measurement model, these being grouped together in the matrix R.

These parameters are then adjusted by trial and error. Nevertheless, a few general indications can be given. The matrix $P_0$ conveys the confidence accorded to the initial value of the state. The initial state is assumed to be zero, and this may be fairly remote from reality. It is therefore not necessary to accord it an overly high confidence, hence a relatively high value of $P_0$ (of the order of $10^{-2}$).

The matrix Q conveys the confidence accorded to the state model. The inaccuracy of the evolution equation for $\theta$ arises from the numerical inaccuracy during the integration of the equations but also from the noise of the gyrometric measurements. The values chosen for the $\theta$-related elements of the matrix Q are therefore slightly greater than the standard deviation of the gyrometer's measurements noise. The values chosen for the $\psi$-related elements will be lower (ratio about $10^{-2}$).

The matrix R conveys the confidence accorded to the measurement model. The inaccuracy of the latter is related to the measurements noise but also to the inherent accelerations measured by the accelerometers (hand tremble, abrupt movements, etc.). The values chosen for this matrix are therefore slightly greater than the standard deviation of the accelerometer's measurements noise.

Several variant embodiments are possible. For some, it is advantageous to retain a two-step algorithm which makes it possible to minimize the number of state variables of the Kalman filter.

A first variant embodiment consists in replacing the angles of torsion $\theta$ and $\psi$ by a quaternion formulation of the same torsion. This variant exhibits the advantage of avoiding the computations of the sines and cosines of the pitch and roll angles that are greedy in terms of computational power. Generally, a rotation quaternion is defined by 4 elements:

$$q = \begin{vmatrix} q_0 \\ q_1 \\ q_2 \\ q_3 \end{vmatrix} \text{ with } \begin{cases} q_0 = \cos\frac{\alpha}{2} \\ q_1 \\ q_2 = \sin\frac{\alpha}{2} \cdot \begin{vmatrix} u_1 \\ u_2 \\ u_3 \end{vmatrix} \\ q_3 \end{cases} \quad \text{Eq. 25}$$

$\alpha$ being the angle of rotation and $$u = \begin{vmatrix} u_1 \\ u_2 \\ u_3 \end{vmatrix}$$

the axis of this rotation the following state vector is chosen:

$x = [q_0 q_1 q_2 q_3]$ the state model is as follows:

$$\dot{q} = \frac{1}{2} \cdot \begin{vmatrix} q_0 \\ q_1 \\ q_2 \\ q_3 \end{vmatrix} \otimes \begin{vmatrix} 0 \\ \omega_X \\ \omega_Y \\ \omega_Z \end{vmatrix} \quad \text{Eq. 26}$$

$\otimes$ symbolizing the multiplication of two quaternions.

$\omega_X = 0$ in the case of a sensor of angular rates with two measurement axes.

The measurement model is:

$Y = [a_X a_Y a_Z]$

The angular rates $\omega_v$ and $\omega_w$ are thereafter obtained through the equation:

$$\begin{pmatrix} 0 \\ \omega_u \\ \omega_v \\ \omega_w \end{pmatrix} = q \otimes \begin{pmatrix} 0 \\ \omega_X \\ \omega_Y \\ \omega_Z \end{pmatrix} \otimes \bar{q} \quad \text{Eq. 27}$$

$\bar{q}$ being the quaternion conjugate to q (i.e. if $q = q0 + q1 \cdot i + q2 \cdot j + q3 \cdot k$, $\bar{q} = q0 - q1 \cdot i - q2 \cdot j - q3 \cdot k$).

A second variant of the algorithm with two steps eliminates, relative to the first embodiment which has been described, the direct computation of the pitch and roll angles. This also makes it possible to save computation time. Nevertheless, in this variant, there is no coupling of the gyrometric and accelerometric measurements in the Kalman filter. It is therefore possible that the resistance to tremble may be reduced. The following state vector is used:

$$\begin{bmatrix} a \\ b \\ c \\ d \end{bmatrix} = \begin{bmatrix} \sin\theta \\ \cos\theta \\ \sin\psi \\ \cos\psi \end{bmatrix} \quad \text{Eq. 28}$$

The state model is $$\dot{x} = \begin{bmatrix} \dot{a} \\ \dot{b} \\ \dot{c} \\ \dot{d} \end{bmatrix} = \begin{bmatrix} 0 & -1 & 0 & 0 \\ 1 & 0 & 0 & 0 \\ 0 & 0 & 0 & -1 \\ 0 & 0 & 1 & 0 \end{bmatrix} \cdot \begin{bmatrix} a \\ b \\ c \\ d \end{bmatrix} \quad \text{Eq. 29}$$

and the measurement model:

$$y = \begin{bmatrix} a_X \\ a_Y \\ a_Z \end{bmatrix} = \begin{bmatrix} -a \\ b.c \\ b.d \end{bmatrix} \quad \text{Eq. 30}$$

These models apply equally to the device with a sensor of angular rates/velocities in relation to two axes and in relation to three axes.

The angular rates/velocities $\omega_v$ and $\omega_w$ are thereafter obtained through the equations, in the case of a two-axis measurement of the angular rate/velocity:

$$\begin{cases} \omega_v = d \cdot \omega_Y - c \cdot \omega_Z \\ \omega_w = b \cdot c \cdot \omega_Y + b \cdot d \cdot \omega_Z \end{cases} \quad \text{Eq. 31}$$

in the case of a three-axis measurement of the angular rate/velocity:

$$\begin{cases} \omega_v = d \cdot \omega_Y - c \cdot \omega_Z \\ \omega_w = a \cdot \omega_X + b \cdot c \cdot \omega_Y + b \cdot d \cdot \omega_Z \end{cases} \quad \text{Eq. 32}$$

Equation 32 reduces to equation 31 in the case of a two-axis measurement by taking $\omega_x$ equal to zero as seen in the other variants.

In the embodiments described above, the algorithm is decomposed into two main steps, with the advantage of decreasing the dimension of the state vector and of simplifying the computations in the filter. Nevertheless, a variant consists in solving the problem in a single step. The state vector and the measurement vector then become:

$$x = [\theta \psi \omega_u \omega_v \omega_w]$$

$$y = [a_X a_Y a_Z \omega_x \omega_Y \omega_Z]$$

$\omega_X = 0$ in the case of a sensor of angular rates/velocities with two measurement axes. In this variant, we propose to define the angles $\theta$ and $\psi$ as being the angles of rotation conveying the switch from the reference frame (XYZ) to the reference frame (uvw), the rotation inverse to the previous case. This makes it possible to express $\theta$ and $\psi$ on the basis of the angular rate/velocity vector expressed in the reference frame (uvw). The state variables are therefore related by the equations of the state model thus rendering this formulation more robust.

The state model is:

$$\begin{cases} \dot\theta = \alpha \cdot \sqrt{\omega_v^2 + \omega_w^2} \\ \dot\psi = \omega_u \\ \dot\omega_u = -\frac{1}{\tau} \cdot \omega_u \\ \dot\omega_v = -\frac{1}{\tau} \cdot \omega_v \\ \dot\omega_w = -\frac{1}{\tau} \cdot \omega_w \end{cases} \quad \text{Eq. 33}$$

where $\tau$: time constant of the evolution model for the angular rate (s).

The measurement models are different depending on whether the measurements of two axes or of three axes of angular rate/velocity sensors are used. In the two-axis case:

$$\begin{cases} a_X = -\sin\theta \cdot \cos\psi \\ a_Y = -\sin\psi \\ a_Z = \cos\theta \cdot \cos\psi \\ \omega_Y = \sin\theta \cdot \sin\psi \cdot \omega_u + \cos\psi \cdot \omega_v + \cos\theta \cdot \sin\psi \cdot \omega_w \\ \omega_Z = \sin\theta \cdot \cos\psi \cdot \omega_u - \sin\psi \cdot \omega_v + \cos\theta \cdot \cos\psi \cdot \omega_w \end{cases} \quad \text{Eq. 34}$$

In the three-axis case:

$$\begin{cases} a_X = -\sin\theta \cdot \cos\psi \\ a_Y = -\sin\psi \\ a_Z = \cos\theta \cdot \cos\psi \\ \omega_X = \cos\theta \cdot \omega_u - \sin\theta \cdot \omega_w \\ \omega_Y = \sin\theta \cdot \sin\psi \cdot \omega_u + \cos\psi \cdot \omega_v + \cos\theta \cdot \sin\psi \cdot \omega_w \\ \omega_Z = \sin\theta \cdot \cos\psi \cdot \omega_u - \sin\psi \cdot \omega_v + \cos\theta \cdot \cos\psi \cdot \omega_w \end{cases} \quad \text{Eq. 35}$$

It should be noted that this formulation gives rise to an increase in the number of adjustment parameters. Moreover, the choice of the evolution model for the angular rate/velocity is generally tricky since no physical law makes it possible to describe "the random motion" of the carrier of the device. Nevertheless, this embodiment exhibits the advantage of affording access to an estimation of the component $\omega_u$ of the angular rate without necessarily using the measurement $\omega_X$.

The Extended Kalman filter comes into the category of non-linear observers. This filter is generally employed on account of its robustness and the quality of the results obtained. Nevertheless, it may be prone to numerical instability problems and to a lack of proof of convergence. Other observers, such as high-gain observers or else sliding-horizon observers, may be used, their convergence being mathematically provable. These observers also exhibit a restricted number of adjustment parameters, hence ease of implementation. It will be possible to perform the latter by using the state and measurement models described previously.

The previous information taken into account in the embodiments of the invention comprising an EKF to describe the state evolutions and the measurement models can also be used in the case of the procedures comprising a non-linear operator with minimization of a cost or of an error. The measurement models are generally taken into account in the error criterion which globally measures the distance between the real measurement at the instant t and the measurement predicted by the model knowing the estimation of the state at the instant t−1. The model of the evolution of the state for its part is, in general, exploited to fix the starting value of these error minimization procedures. The evolution functions are applied to the previous state estimation, thereby making it possible to predict the following state, as starting data for the optimization function.

Thus, the compensation of the angles of torsion can also be effected through an optimal resolution procedure not calling upon an observer. Among the optimization procedures of this type mention may, for example, be made of gradient descent, Newton optimization, or an optimization procedure termed quasi-Newton, etc. As in the case of the Kalman filter, two different formulations can be implemented:

joint optimization of the variables $\theta$ $\psi$ $\omega_u$ $\omega_v$ $\omega_w$, estimation in two successive steps: estimation of the angles [$\theta$ $\psi$] by optimization and then analytical computation of $\omega_v$ and $\omega_w$ using equation 19.

In both these cases, the optimization criterion is defined by:

$$f = \sum_{i=1}^{n} (\text{measurements}_{sensors} - \text{measurements}_{estimated})^T \cdot \quad \text{Eq. 36}$$

$$(\text{measurements}_{sensors} - \text{measurements}_{estimated})$$

with in the case of the first formulation (one-step resolution), $$\text{measurements}_{sensors} = \begin{bmatrix} a_X \\ a_Y \\ a_Z \\ 0 \text{ ou } \omega_X \\ \omega_Y \\ \omega_Z \end{bmatrix} \quad \text{Eq. 37}$$

$$\text{measurements}_{estimated} = \begin{bmatrix} -\sin\theta \\ \cos\theta \cdot \sin\psi \\ \cos\theta \cdot \cos\psi \\ \cos\theta \cdot \omega_u - \sin\theta \cdot \omega_w \\ \sin\theta \cdot \sin\psi \cdot \omega_u + \cos\psi \cdot \omega_v + \cos\theta \cdot \sin\psi \cdot \omega_w \\ \sin\theta \cdot \cos\psi \cdot \omega_u - \sin\psi \cdot \omega_v + \cos\theta \cdot \cos\psi \cdot \omega_w \end{bmatrix} \quad \text{Eq. 38}$$

and in the case of the second formulation (two-step resolution), $$\text{measurements}_{sensors} = \begin{bmatrix} a_X \\ a_Y \\ a_Z \end{bmatrix} \quad \text{Eq. 39}$$

$$\text{measurements}_{estimated} = \begin{bmatrix} -\sin\theta \\ \cos\theta \cdot \sin\psi \\ \cos\theta \cdot \cos\psi \end{bmatrix} \quad \text{Eq. 40}$$

It will be noted that for certain applications where the saving of computational power is more important than the smoothing of tremble and other disturbances of the accelerometric measurements, an analytical resolution procedure may be preferred to an optimal resolution procedure.

In this case, the analytical resolution is done in two steps: computation of the cos/sin of the orientations θ and ψ on the basis of the expression for the accelerometric measurements (Eq. 2), we deduce:

$$\begin{cases} \cos\theta = \pm\sqrt{a_Y^2 + a_Z^2} \\ \sin\theta = -a_X \end{cases} \quad \text{Eq. 41}$$

$$\begin{cases} \cos\psi = \dfrac{a_Z}{\pm\sqrt{a_Y^2 + a_Z^2}} \\ \sin\psi = \dfrac{a_Y}{\pm\sqrt{a_Y^2 + a_Z^2}} \end{cases}$$

we make the assumption that the angle θ lies between $$-\frac{\pi}{2}$$

and $$+\frac{\pi}{2},$$

thereby making it possible to remove the indeterminacy in the sign of cos θ:

$$\cos\theta = +\sqrt{a_Y^2 + a_Z^2}.$$

Computation of $\omega_v$ and $\omega_w$ $$\begin{pmatrix} \omega_u \\ \omega_v \\ \omega_w \end{pmatrix} = R^T \cdot \begin{pmatrix} \omega_X \\ \omega_Y \\ \omega_Z \end{pmatrix} \quad \text{Eq. 42}$$

$$\begin{cases} \omega_u = \cos\theta \cdot \omega_X + \sin\theta \cdot \sin\psi \cdot \omega_Y + \sin\theta \cdot \cos\psi \cdot \omega_Z \\ \omega_v = \cos\psi \cdot \omega_Y - \sin\psi \cdot \omega_Z \\ \omega_w = -\sin\theta \cdot \omega_X + \cos\theta \cdot \sin\psi \cdot \omega_Y + \cos\theta \cdot \cos\psi \cdot \omega_Z \end{cases} \quad \text{Eq. 43}$$

The examples described above are given by way of illustration of embodiments of the invention. They in no way limit the field of the invention which is defined by the claims which follow.

The invention claimed is:

1. A pointing device for pointing by a user at a mobile element in a plane surface comprising a reference frame, said pointing device comprising:
   at least one first sensor for measuring angular velocities ($\omega_Y$, $\omega_Z$) of said pointing device about at least two orthogonal axes (Y, Z) of the pointing device;
   at least one second sensor for measuring linear accelerations ($a_X$, $a_Y$, $a_Z$) of said pointing device in relation to said two axes (Y, Z) and a third orthogonal axis (X); and
   a module for computing displacements (dy, dz) to be imparted to the mobile element in the plane surface as a function of rotations of the pointing device in space, said computation module comprising a sub-module for compensating for torsion imparted to the pointing device by implementing a data fusion algorithm, wherein said data fusion algorithm is configured for:
   i) receiving as input at least measurements by the first sensor of angular velocities ($\omega_Y$, $\omega_Z$) and by the second sensor of linear accelerations ($a_X$, $a_Y$, $a_Z$); and
   ii) estimating from said measurements a state vector comprising variables representative of a torsion imparted to the pointing device relative to a horizontal plane of a reference frame of the user and further providing at least angular velocities ($\omega_v$, $\omega_w$) of the pointing device in the reference frame of the user which provide torsion-compensated displacements (dy, dz) of the mobile element in the reference frame of the plane surface of the mobile element.

2. The pointing device of claim 1, wherein the first sensor is a two-axis gyrometer.

3. The pointing device of claim 1, wherein the first sensor is a three-axis gyrometer.

4. The pointing device of claim 3, wherein the angular velocities ($\omega_v$, $\omega_w$) in the reference frame of the user are computed from the first sensor angular velocities, using the variables representative of a torsion.

5. The pointing device of claim 1, wherein the second sensor is a three-axis accelerometer producing outputs ($a_X$, $a_Y$, $a_Z$).

6. The pointing device of claim 1, wherein the data fusion algorithm implements a Kalman filter.

7. The pointing device of claim 6, wherein the Kalman filter satisfies at least one of the following conditions:
   a state vector (x) of the Kalman filter comprises at least one angle of torsion (θ, ψ) of the pointing device;
   a state model comprises at least an expression for an angular rate (ω) of said pointing device as a function of at least one of the angles of torsion (θ, ψ); and
   a measurements vector of the Kalman filter comprises at least the outputs of the second sensor ($a_X$, $a_Y$, $a_Z$).

8. The pointing device of claim 7, wherein the state vector of the Kalman filter is initialized to a state $[\theta_0\ \psi_0]$ chosen a priori and in that an a priori estimation of the state vector $(\hat{x}_k^-)$ in a Kalman filter sampling step k is computed through the following formula:

$$\hat{x}_k^- = \begin{pmatrix} \hat{\theta}_k^- \\ \hat{\psi}_k^- \end{pmatrix} = \begin{pmatrix} \hat{\theta}_{k-1} \\ \hat{\psi}_{k-1} \end{pmatrix} + T_e \cdot \begin{pmatrix} \alpha \cdot \sqrt{\omega_Y^2 + \omega_Z^2} \\ \omega_X \end{pmatrix}$$

where $T_e$ is a filter sampling period.

9. The pointing device of claim 7, wherein an a priori estimation of the measurements $(\hat{y}_k^-)$ in a Kalman filter sampling step k is computed through the following formula:

$$\hat{y}_k^- = \begin{vmatrix} -\sin\hat{\theta}_k^- \\ \cos\hat{\theta}_k^- \cdot \sin\hat{\psi}_k^- \\ \cos\hat{\theta}_k^- \cdot \cos\hat{\psi}_k^- \end{vmatrix}.$$

10. The pointing device of claim 7, wherein a gain G of the Kalman filter is computed through the following formula:

$$A_k = \frac{\partial f}{\partial x}\bigg|_{\hat{x}_{k-1|k-1}}$$

$$C_k = \frac{\partial h}{\partial x}\bigg|_{\hat{x}_{k-1|k-1}}$$

$$M = \begin{bmatrix} R_f & 0 \\ P_f \cdot C^T & P_f \cdot A^T \\ 0 & Q_f \end{bmatrix}$$

$$HM = qr(M) = \begin{bmatrix} L & K \\ 0 & P_f \\ 0 & 0 \end{bmatrix}$$

$$G = K^T \cdot L^{-T}.$$

11. The pointing device of claim 7, wherein a correction of the state estimated a priori in a Kalman filter sampling step k is computed through the following formula:

$$\hat{x}_k = \hat{x}_k^- + K_k \cdot \left( \begin{bmatrix} a_{X,k} \\ a_{Y,k} \\ a_{Z,k} \end{bmatrix} - \hat{y}_k^- \right).$$

12. The pointing device of claim 7, wherein the components $\omega_v$ and $\omega_w$ of the angular rate in the reference frame of the user are computed through the following formula:

$$\begin{cases} \omega_v = \cos\hat{\psi} \cdot \omega_Y - \sin\hat{\psi} \cdot \omega_Z \\ \omega_w = -\sin\hat{\theta} \cdot \omega_X + \cos\hat{\theta} \cdot \sin\hat{\psi} \cdot \omega_Y + \cos\hat{\theta} \cdot \cos\hat{\psi} \cdot \omega_Z \end{cases}.$$

13. The pointing device of claim 7, wherein the Kalman filter satisfies at least one of the following conditions:
a matrix $P_0$ of confidence accorded to an initial value of a state $(x_0)$ comprises chosen values of an order of $10^{-2}$;
a matrix Q of confidence accorded to the state model comprises chosen values, a highest of which are greater than a standard deviation of a noise of the measurements of the first sensor;
a matrix R of confidence accorded to a measurement model of the Kalman filter comprises chosen values, a highest of which are greater than a standard deviation of noise of the measurements of the second sensor.

14. The pointing device of claim 6, wherein the Kalman filter satisfies at least one of the following conditions:
a state vector (x) of the Kalman filter is a quaternion of a form $[\cos \alpha/2, \sin \alpha/2\ u_1, \sin \alpha/2\ u_2, \alpha/2\ u_3]$;
a state model of the Kalman filter is of the form:

$$\dot{q} = \frac{1}{2} \cdot \begin{vmatrix} q_0 \\ q_1 \\ q_2 \\ q_3 \end{vmatrix} \otimes \begin{vmatrix} 0 \\ \omega_X \\ \omega_Y \\ \omega_Z \end{vmatrix}\ ; \text{and}$$

a measurements vector of the Kalman filter comprises at least the outputs of the second sensor $(a_X, a_Y, a_Z)$.

15. The pointing device of claim 14, wherein the components $\omega_v$ and $\omega_w$ of an angular rate in the reference frame of the user are computed through the following formula:

$$\begin{pmatrix} 0 \\ \omega_u \\ \omega_v \\ \omega_w \end{pmatrix} = q \otimes \begin{pmatrix} 0 \\ \omega_X \\ \omega_Y \\ \omega_Z \end{pmatrix} \otimes \bar{q}.$$

16. The pointing device of claim 6, wherein the Kalman filter satisfies at least one of the following conditions:
a state vector (x) of the Kalman filter is of a form $[a, b, c, d]=[\sin \theta, \cos \theta, \sin \psi, \cos \psi]$;
a state model of the Kalman filter is of the form:

$$\dot{x} = \begin{bmatrix} \dot{a} \\ \dot{b} \\ \dot{c} \\ \dot{d} \end{bmatrix} = \begin{bmatrix} 0 & -1 & 0 & 0 \\ 1 & 0 & 0 & 0 \\ 0 & 0 & 0 & -1 \\ 0 & 0 & 1 & 0 \end{bmatrix} \cdot \begin{bmatrix} a \\ b \\ c \\ d \end{bmatrix}\ ; \text{and}$$

a measurement model of the Kalman filter is of the form:

$$y = \begin{bmatrix} a_X \\ a_Y \\ a_Z \end{bmatrix} = \begin{bmatrix} -a \\ b \cdot c \\ b \cdot d \end{bmatrix}.$$

17. The pointing device of claim 16, wherein the components $\omega_v$ and $\omega_w$ of an angular rate in the reference frame of the user are computed through the following formula:

$$\begin{cases} \omega_v = d \cdot \omega_Y - c \cdot \omega_Z \\ \omega_w = -a \cdot \omega_X + b \cdot c \cdot \omega_Y + b \cdot d \cdot \omega_Z \end{cases}.$$

18. The pointing device of claim 6, wherein a state vector of the Kalman filter (x) is of a form $[\theta, \psi, \omega_u, \omega_v, \omega_w]$ and in that a measurements vector of the Kalman filter is of a form $[a_X, a_Y, a_Z, \omega_X, \omega_Y, \omega_Z]$.

19. The pointing device of claim 18, wherein a state model of the Kalman filter is of a form:

$$\begin{cases} \dot{\theta} = \alpha \cdot \sqrt{\omega_v^2 + \omega_w^2} \\ \dot{\psi} = \omega_u \\ \dot{\omega}_u = -\frac{1}{\tau} \cdot \omega_u \\ \dot{\omega}_v = -\frac{1}{\tau} \cdot \omega_v \\ \dot{\omega}_w = -\frac{1}{\tau} \cdot \omega_w \end{cases}$$

where $\tau$ is a time constant of an evolution model for the angular rate and in that a measurement model is of one of the following forms:

$$\begin{cases} a_X = -\sin\theta \cdot \cos\psi \\ a_Y = -\sin\psi \\ a_Z = \cos\theta \cdot \cos\psi \\ \omega_Y = \sin\theta \cdot \sin\psi \cdot \omega_u + \cos\psi \cdot \omega_v + \cos\theta \cdot \sin\psi \cdot \omega_w \\ \omega_Z = \sin\theta \cdot \cos\psi \cdot \omega_u - \sin\psi \cdot \omega_v + \cos\theta \cdot \cos\psi \cdot \omega_w \end{cases}$$

or $$\begin{cases} a_X = -\sin\theta \cdot \cos\psi \\ a_Y = -\sin\psi \\ a_Z = \cos\theta \cdot \cos\psi \\ \omega_X = \cos\theta \cdot \omega_u - \sin\theta \cdot \omega_w \\ \omega_Y = \sin\theta \cdot \sin\psi \cdot \omega_u + \cos\psi \cdot \omega_v + \cos\theta \cdot \sin\psi \cdot \omega_w \\ \omega_Z = \sin\theta \cdot \cos\psi \cdot \omega_u - \sin\psi \cdot \omega_v + \cos\theta \cdot \cos\psi \cdot \omega_w. \end{cases}$$

20. The pointing device of claim 1, wherein the data fusion algorithm implements an optimal resolution procedure.

21. The pointing device of claim 20, wherein the optimal resolution procedure is an optimization having as criterion a function:

$$f = \sum_{i=1}^{n} (\text{measurements}_{sensors} - \text{measurements}_{estimated})^T \cdot (\text{measurements}_{sensors} - \text{measurements}_{estimated})$$

with a pair of vectors ($\text{measurements}_{sensors}$, $\text{measurements}_{estimated}$) chosen from a group $$\left( \text{measurements}_{sensors} = \begin{bmatrix} a_X \\ a_Y \\ a_Z \\ 0 \text{ or } \omega_X \\ \omega_Y \\ \omega_Z \end{bmatrix}, \right.$$

$$\left. \text{measurements}_{estimated} = \begin{bmatrix} -\sin\theta \\ \cos\theta \cdot \sin\psi \\ \cos\theta \cdot \cos\psi \\ \cos\theta \cdot \omega_u - \sin\theta \cdot \omega_w \\ \sin\theta \cdot \sin\psi \cdot \omega_u + \cos\psi \cdot \omega_v + \cos\theta \cdot \sin\psi \cdot \omega_w \\ \sin\theta \cdot \cos\psi \cdot \omega_u - \sin\psi \cdot \omega_v + \cos\theta \cdot \cos\psi \cdot \omega_w \end{bmatrix} \right)$$

$$\left( \text{measurements}_{sensors} = \begin{bmatrix} a_X \\ a_Y \\ a_Z \end{bmatrix}, \; \text{measurements}_{estimated} = \begin{bmatrix} -\sin\theta \\ \cos\theta \cdot \sin\psi \\ \cos\theta \cdot \cos\psi \end{bmatrix} \right).$$

22. The pointing device of claim 1, wherein the state vector further comprises the angular velocities ($\omega_v$, $\omega_w$) in the reference frame of the user.

23. A method for controlling displacements of a mobile element in a plane surface using a freely moveable object in three-dimensional space, said object being equipped with at least one first sensor for measuring angular velocities ($\omega_Y$, $\omega_Z$) of said object about at least two of orthogonal axes (Y, Z) of the object and at least one second sensor for measuring linear accelerations of said object in relation to said two axes (Y, Z) and a third orthogonal axis (X), the method comprising, by a processor carrying out instructions of a data fusion algorithm for performing the steps of:

i) receiving as input at least measurements by the first sensor of angular velocities ($\omega_Y$, $\omega_Z$) and by the second sensor of linear accelerations ($a_X$, $a_Y$, $a_Z$); and ii) estimating from said measurements a state vector comprising variables representative of a torsion imparted to the object relative to a horizontal plane of a reference frame of the user and further providing at least angular velocities ($\omega_v$, $\omega_w$) of the object in the reference frame of the user which provide torsion-compensated displacements (dy, dz) of the object in the plane surface.

* * * * *